United States Patent [19]

Haas et al.

[11] Patent Number: 5,004,482
[45] Date of Patent: Apr. 2, 1991

[54] PRODUCTION OF DRY, HIGH PURITY NITROGEN

[75] Inventors: Oscar W. Haas, Cheektowaga; Ravi Prasad, East Amherst; James Smolarek, Boston, all of N.Y.

[73] Assignee: Union Carbide Corporation, Danbury, Conn.

[21] Appl. No.: 350,772

[22] Filed: May 12, 1989

[51] Int. Cl.$^5$ .............................. B01D 53/22; B01D 53/04
[52] U.S. Cl. .......................................... 55/16; 55/26; 55/33; 55/62; 55/68; 55/158; 55/179; 55/387
[58] Field of Search .............. 55/16, 25, 26, 31, 33, 55/62, 68, 74, 75, 158, 161–163, 179, 180, 387, 389

[56] References Cited

U.S. PATENT DOCUMENTS

| | | | |
|---|---|---|---|
| 3,735,558 | 5/1973 | Skarstrom et al. | 55/16 |
| 3,735,599 | 5/1973 | Izumichi et al. | 62/21 |
| 3,967,464 | 7/1976 | Cromier et al. | 62/13 |
| 4,119,417 | 10/1978 | Heki et al. | 55/158 |
| 4,264,340 | 4/1981 | Sircar et al. | 55/25 |
| 4,398,926 | 8/1983 | Doshi | 55/25 X |
| 4,448,595 | 5/1984 | Cheung | 62/31 |
| 4,453,957 | 6/1984 | Pahade et al. | 62/25 |
| 4,497,640 | 2/1985 | Fournié et al. | 55/16 |
| 4,589,888 | 5/1986 | Hiscock et al. | 55/26 |
| 4,594,085 | 6/1986 | Cheung | 62/25 |
| 4,599,094 | 7/1986 | Werner et al. | 55/26 |
| 4,639,257 | 1/1987 | Duckett et al. | 55/16 |
| 4,645,516 | 2/1987 | Doshi | 55/16 |
| 4,687,498 | 8/1987 | Maclean et al. | 62/17 |
| 4,690,695 | 9/1987 | Doshi | 55/16 |
| 4,701,187 | 10/1987 | Choe et al. | 55/16 |
| 4,718,921 | 1/1988 | Makino et al. | 55/16 |
| 4,734,106 | 3/1988 | Gollan | 55/16 |
| 4,765,804 | 8/1988 | Loyd-Williams et al. | 55/25 X |
| 4,781,907 | 11/1988 | McNeill | 55/16 X |
| 4,783,201 | 11/1988 | Rice et al. | 55/16 |
| 4,783,203 | 11/1988 | Doshi | 55/26 X |
| 4,844,719 | 7/1989 | Toyomoto et al. | 55/16 |
| 4,857,081 | 8/1989 | Taylor | 55/16 |
| 4,863,492 | 9/1989 | Doshi et al. | 55/25 X |
| 4,881,953 | 11/1989 | Prasad et al. | 55/16 |
| 4,894,068 | 1/1990 | Rice | 55/16 |
| 4,931,070 | 6/1990 | Prasad | 55/16 |

FOREIGN PATENT DOCUMENTS 0226431 6/1987 European Pat. Off.

OTHER PUBLICATIONS

Gas Separation by Permeation, C—Y Pan et al., The Canadian Journal of Chemical Engineering, vol. 56, Apr. 1978, pp. 197–209.
Gas Separation by Permeators with High—Flux Asymmetric Membranes, C—Y Pan, AIChE Journal, vol. 29, No. 4, Jul. 1983, pp. 545–552.
Asymmetric Cellulose Acetate Hollow Fibers: Studies in Gas Permeation, M. Sidhoum et al., AIChE Journal, Mar. 1988, vol. 34, No. 3, pp. 417–425.
C&EN, Apr. 29, 1985, p. 16 "Monsanto Tests Separators for Dehydration".
C&EN, Jul. 18, 1988, p. 35, "Membrane-Based Compressed Air Dryer".

*Primary Examiner*—Robert Spitzer
*Attorney, Agent, or Firm*—Alvin H. Fritschler

[57] ABSTRACT

Wet feed air to, or high purity nitrogen from, a pressure swing adsorption system is dried in a dryer membrane system preferably operated with a countercurrent flow path. Drying is enhanced by the use of a purge gas on the permeate side of the membrane, with waste gas from the pressure swing adsorption system or a portion of the dry, high purity nitrogen product gas being used as purge gas.

21 Claims, 2 Drawing Sheets

PRODUCTION OF DRY, HIGH PURITY NITROGEN

BACKGROUND OF THE INVENTION

1. Field of the Invention

The invention relates to the production of nitrogen from air. More particularly, it relates to the production of dry, high purity nitrogen.

2. Description of the Prior Art

High purity nitrogen is desired for many chemical processing, refinery, metal production and other industrial applications. While various techniques are known for the production of nitrogen by air separation, pressure swing adsorption (PSA) processing is particularly desirable for relatively small sized operations in which the use of a cryogenic air separation plant may not be economically feasible.

In the PSA process for air separation, feed air is passed at a higher adsorption pressure to an adsorbed bed capable of selectively adsorbing either nitrogen or oxygen as the more readily adsorbable component of air. The bed is thereafter depressurized to a lower desorption pressure for desorption of said more readily adsorbable component and its removal from the bed prior to the introduction of additional quantities of feed air to the bed as cyclic adsorption desorption operations are continued in the bed. The PSA process is commonly carried out in multi-bed systems, with each bed employing the desired processing sequence on a cyclic basis interrelated to the carrying out of said processing sequence in other beds in the system.

Two different PSA processes and systems have been employed commercially to produce product nitrogen at purities of up to about 99.5%. In one approach, a rate selective carbon molecular sieve adsorbent is used in a fast processing cycle, based on the selective adsorption of oxygen as the more readily adsorbable component of air, to produce nitrogen, as the less readily adsorbable component withdrawn from the product end of the bed, at the adsorption pressure and with a relatively low dewpoint, such as $-40°$ F. It has been recognized, however, that the presence of moisture in the feed air to such a PSA system significantly reduces the separation efficiency of the adsorbent beds. For this reason, it is common practice to employ a separate PSA adsorbent dryer ahead of the air separation PSA system to remove moisture from the feed air before it passes to said air separation PSA system.

In another PSA process and system approach, adsorbents capable of selectively adsorbing nitrogen from air on an equilibrium selective basis are employed. In such systems, air is passed to the adsorbent bed, typically at slightly above atmospheric, and vacuum pumps are used to draw off a nitrogen-rich wet nitrogen product stream from the bed. Zeolitic molecular sieves are commonly employed in such operations. The Werner et al. patent, U.S. Pat. No. 4,599,094, discloses the details of the processing sequence used in such a PSA nitrogen process for the recovery of high purity nitrogen product. The nitrogen product obtained is generally wet since, in addition to the moisture transferred from the inlet air to the product nitrogen, some additional moisture is commonly added thereto from the water seals of the vacuum pumps. In many such applications, therefore, it is necessary to compress the recovered nitrogen product and remove moisture therefrom. This is done to prevent condensation and subsequent corrosion or freezing in plant piping and instrumentation, or because its presence is incompatible with the desired end use of the product nitrogen. One feasible approach to the problem of moisture in the product nitrogen is to use a product compressor, aftercooler, moisture separator and adsorptive dryer to produce a dry, high purity nitrogen stream.

The use of adsorptive pre- or post-dryers in PSA-nitrogen systems adds significantly to the overall complexity and cost of the process and system, and reduces its reliability. Such dryers typically have multiple adsorbent vessels with interconnecting piping and valves. A significant amount of nitrogen product gas, e.g. from 5 to 30% of the feed air, may be required for bed regeneration purposes as part of the overall PSA processing sequence employed. If a thermal swing cycle were used, some purge energy expenditure would also be required. If the waste oxygen stream were used as a bed regeneration gas, special precautions efficiency and cost of the nitrogen production operation, there is a desire in the art for improvements in the production of dry, high purity nitrogen by the PSA approach, particularly improvements with respect to the removal of moisture from high purity nitrogen.

It is an object of the invention, therefore, to provide an improved process bed system for the production of dry, high purity nitrogen product.

It is another object of the invention to provide an improved process and system utilizing the PSA approach for air separation and providing for desired pre- or post-drying for moisture removal and the recovery of dry, high purity nitrogen product.

With these and other objects in mind, the invention is hereinafter described in detail, the novel features thereof being particularly pointed out in the appended claims.

SUMMARY OF THE INVENTION

A membrane dryer system is employed in conjunction with a PSA-nitrogen system to provide a simple, low cost alternative to the use of an adsorptive dryer to produce high purity nitrogen in dry form. The membrane dryer is desirably operated with a countercurrent flow pattern and is refluxed on the low pressure permeate side thereof with a relatively dry purge gas to reduce the area requirements of the membrane and to increase desired product recovery. Such purge stream is desirably obtained from the oxygen waste from the PSA system

BRIEF DESCRIPTION OF THE DRAWINGS

The invention is hereinafter described in detail with reference to the accompanying drawing in which.

DETAILED DESCRIPTION OF THE INVENTION

The objects of the invention are accomplished by the integration of a membrane system for nitrogen or feed air drying with a PSA system under conditions enabling desired moisture removal from the high purity nitrogen product, or from the feed air, to be accomplished without reduction in the overall product recovery of the process and system to unacceptable levels. Such conditions advantageously relate to the integration of separate processing systems, the selectivity for moisture removal of the particular membrane composition employed, and membrane bundle design conditions under which countercurrent flow is preferably achieved in the dryer membrane system. This enables high purity nitrogen product to be recovered in dry form with minimum loss of said product during the drying operation.

In the practice of the invention waste gas or a portion of the dry nitrogen product gas from the PSA system is used to provide purge gas to the dryer membrane system so as to enable a dry, high purity nitrogen stream to be obtained with minimum loss of desired product because of the requirements of the drying operation. The overall process and system of the invention can be illustrated with reference to the drawings. Details concerning the PSA systems suitable for use in the practice of the invention, and the membrane systems to be integrated therewith for achieving enhanced drying of nitrogen product are described below.

Figure 1:
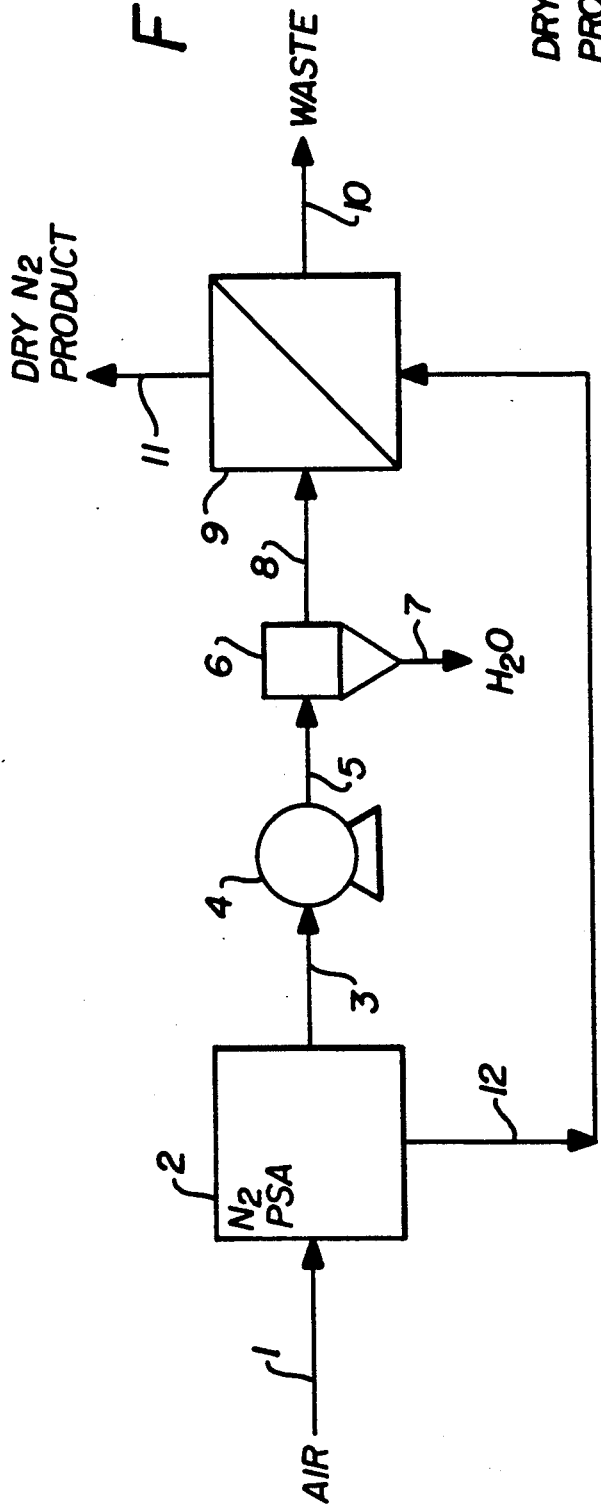
FIG. 1 is a schematic flow diagram of an embodiment of the invention in which the waste gas from a PSA-nitrogen system employing a nitrogen selective adsorbent is employed as purge gas for a membrane post-dryer system.

In FIG. 1 of the drawings, feed air is passed in line 1 to air separation PSA-nitrogen system 2, in which nitrogen is selectively adsorbed as the more readily adsorbable component of air, and oxygen, the less readily adsorbable component, is removed from the unit as a waste gas. Upon desorption in the cyclic operation of PSA-nitrogen system 2, nitrogen, as a wet, low pressure gas stream having a purity of about 99.5% by volume nitrogen, is passed in line 3 to product compressor 4 for compression, e.g. to about 80 psig, with the thus-compressed, wet nitrogen product stream passed in line 5 being subject to heat rejection and condensation, with water being removed therefrom in vessel 6, and discharged from the system through line 7. The purified, partially dried nitrogen product is passed in line 8 to dryer membrane system 9. Permeable gas, which contains moisture that permeates through the membrane in said system 9, is withdrawn, together with purge gas, through line 10 for discharge to waste. The desired high purity nitrogen product is recovered from dryer membrane system 9 through line 11 in dry form as nonpermeate gas. The oxygen gas discharged as waste gas from PSA-nitrogen system 2 is passed in line 12 at low pressure, e.g. about 3 psig, to dryer membrane system 9 for use as relatively dry purge gas, it being understood that the moisture content of the feed air tends to selectively adsorb, along with the nitrogen, upon the nitrogen selective adsorbent employed in said PSA system. Such oxygen waste gas, passed from the membrane system through said line 10 carries the moisture which permeates said membrane 9 away from the surface thereof on said permeate side so that a high driving force is maintained across membrane 9 to system the desired moisture removal.

Figure 2:
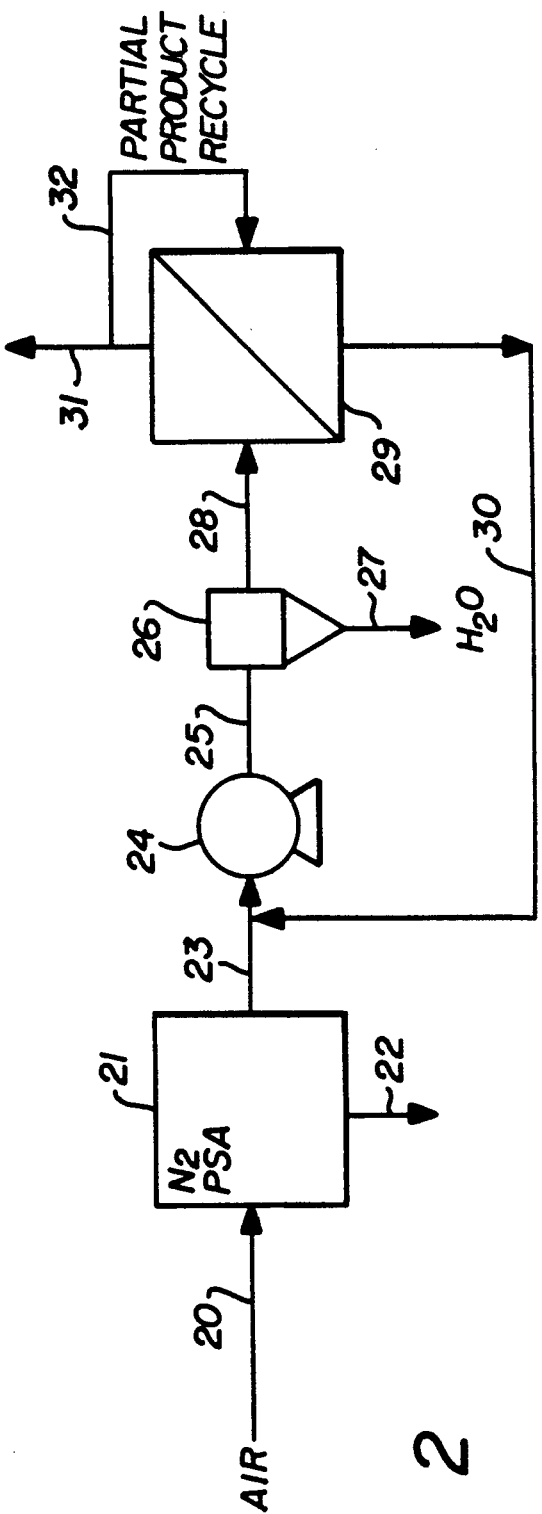
FIG. 2 is a schematic flow diagram of an embodiment of the invention in which a portion of the dry nitrogen product gas from a PSA-nitrogen system employing a nitrogen selective adsorbent is used to provide purge gas to a membrane post-dryer system.

In an alternative embodiment as shown in FIG. 2, a portion of the dry product nitrogen stream is used as said dry purge gas, with the moisture-containing purge gas removed from the dryer membrane system being recycled for passage with the wet, high purity nitrogen product gas for further drying in the dryer membrane unit rather than being discharged to waste as in the FIG. 1 embodiment. In the FIG. 2 embodiment, feed air in line 20 is passed to a PSA-nitrogen system 21 in which nitrogen is selectively adsorbed, and oxygen is passed through the system for discharge to waste through line 22. Upon desorption at lower desorption pressure, high purity, e.g. 99.5% nitrogen is passed from PSA-nitrogen system 21 in line 23, as wet low pressure nitrogen. The nitrogen stream is compressed, as to about 80 psig., in product compressor 24. Upon passage therefrom in line 25 for heat removal and condensation, water is removed from the nitrogen stream in vessel 26 and is discharged through line 27. The purified, partially dried nitrogen product is passed in line 28 to dryer membrane system 29. Permeate gas, which comprises moisture that permeates through the membrane in system 29 is withdrawn, together with purge gas, through line 30 for recycle to line 23 for compression and repassage to dryer membrane system 29 along with additional quantities of wet, high purity nitrogen from PSA-nitrogen system 21. In this embodiment, a side stream of the dry, high purity nitrogen product recovered in line 31 is recycled through line 32 to dryer membrane system 29 for use as relatively dry purge gas, which carries the moisture away from the permeate side of the membrane so that a high driving force is maintained across membrane 29 to sustain the desired moisture removal.

Figure 3:
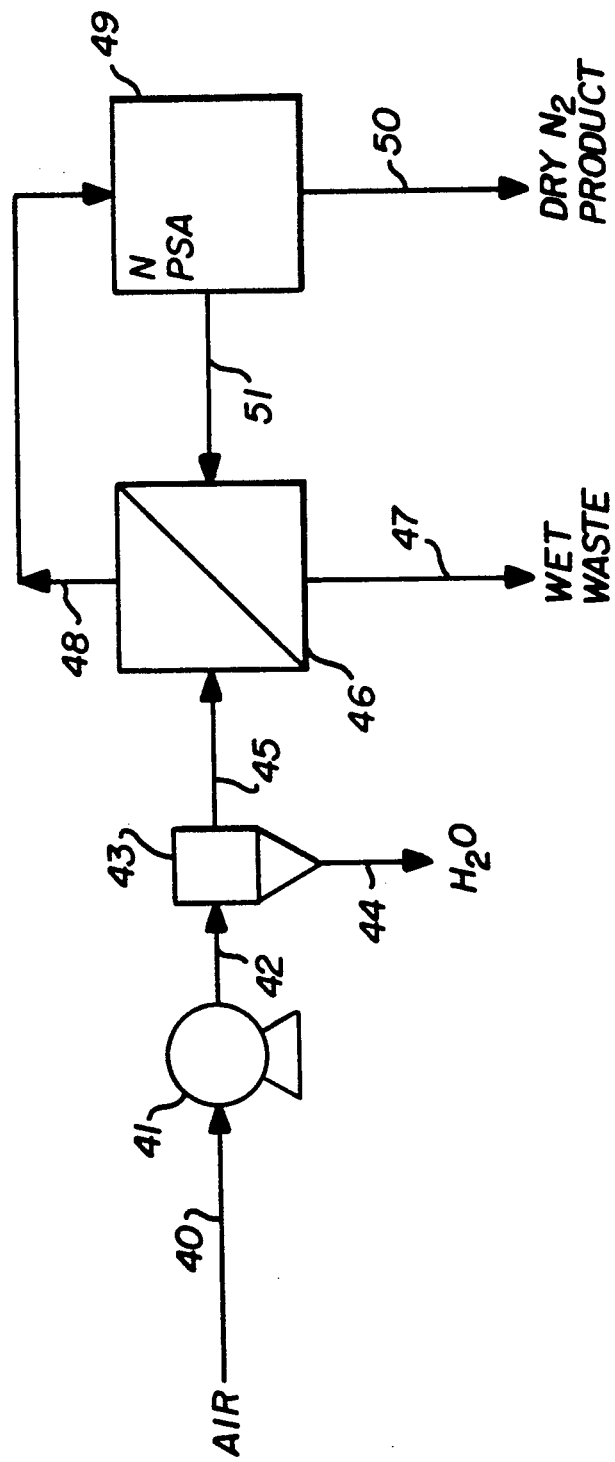
FIG. 3 is a schematic flow diagram of an embodiment of the invention in which the waste gas from a PSA-nitrogen system employing an oxygen selective adsor-

The embodiment of the invention illustrated in FIG. 3, adapted particularly for use in PSA systems in which oxygen is the more readily adsorbable component, employs dryer membrane system as a pre-dryer in contrast to the FIGS. 1 and 2 embodiments in which the dryer membrane system was employed as a post-dryer following treatment of the feed air in a PSA system. In the FIG. 3 embodiment, feed air is passed in line 40 to feed compressor 41 from which compressed air, e.g. at about 90 psig, is passed in line 42 for heat removal and condensation, with water being removed from the feed air stream in vessel 43 and is discharged through line 44. Such compressed, partially dry feed air is passed in line 45 to dryer membrane system 46. Permeate gas, which comprises moisture that permeates through the membrane in system 46 is withdrawn, together with purge gas, through line 47 for discharge to waste. Dry feed air is recovered from said membrane system 46 through line 48 and is passed to PSA-nitrogen system 49. With oxygen selective adsorbent in said PSA system, dry, high purity nitrogen product passes through said PSA system and is recovered as the less readily adsorbable component of air in product line 50. Upon desorption, the more readily adsorbable component of the feed air, namely dry oxygen, is removed from PSA-nitrogen system 49 through line 51 for use as dry purge gas in dryer membrane system 46. Thus, the dry oxygen purge gas carries the moisture that has permeated to the permeate side of the membrane away from said permeate side of the membrane so that a high driving force is maintained across membrane 46 to sustain the desired moisture removal.

In the practice of the invention, therefore, it will be seen that dryer membrane systems can be effectively integrated with PSA-nitrogen systems so as to conveniently dry the high purity nitrogen product from a PSA-nitrogen system in the feed air stream to said system. The dryer membrane system operation is enhanced by the use of purge gas on the permeate side thereof, with dry waste gas from the PSA-nitrogen system or a portion of the dry, high purity nitrogen stream from said PSA-nitrogen system being used as the purge gas for the dryer membrane system.

It should be noted that the overall system described with reference to FIG. 3 can be conveniently modified for use as a PSA-oxygen system with dry oxygen being recovered through line 50 as the desired product gas. For this purpose, PSA system 49 would preferably be a system adapted for the selective adsorption of nitrogen as the more readily adsorbable component of feed air, with oxygen being recovered as the less readily adsorbable component thereof. Upon desorption from the adsorbent bed in the cyclic operation of such a PSA system, dry nitrogen would be removed from PSA-oxygen system 49 through line 51 for use as dry purge gas in dryer membrane system 46. Such PSA-oxygen systems, typically multi-bed systems, are known in the art and utilize, as in PSA-nitrogen systems, cyclic operation of particular processing sequences for the adsorption of the more readily adsorbable component at upper adsorption pressure, depressurization, desorption of the more readily adsorbable component, typically followed by purge, and repressurization to said upper adsorption pressure. The Hiscock, et al. patent, U.S. Pat. No. 4,589,888, describes various PSA-oxygen systems and processing sequences in which oxygen product is recovered as the less readily adsorbable component of feed air. While less preferred, it will be appreciated that other systems and processes for the recovery of oxygen product, and the recycle of dry nitrogen to dryer membrane system 46, can be based on the selective adsorption of oxygen, rather than nitrogen, as the more readily adsorbable component. Generally for such purpose, rate selective adsorbents, such as carbon adsorbent materials, will be used in the adsorbent beds of the PSA system in place of the equilibrium selective adsorbents, such as zeolitic molecular sieves, used when nitrogen is the more readily adsorbable component.

Certain membranes are known to selectively remove moisture from compressed nitrogen streams. Unfortunately it has been found, as disclosed in U.S. Pat. No. 4,783,201, that, when operated in a crossflow permeation manner, such membranes may require a stage cut., i.e. the ratio of permeate gas to feed gas flow, of roughly 30% wt., for example, 150 psig operation to achieve a relatively modest pressure dewpoint of 40° F. Obviously, the product gas recovery of such a crossflow membrane unit would be quite low, and the power and dryer area requirements of such an overall system would be unattractively high. In order to enhance the benefits of the integrated systems in the practice of the invention, however, the dryer membrane system is desirably operated in a countercurrent manner, with dry reflux purge gas being passed on the permeate side of the membrane to facilitate the carrying away of moisture from said permeate side and the maintaining of a high driving force across the membrane for moisture removal. This processing feature serves to minimize the membrane area required and the product permeation loss necessary to achieve a given product dewpoint, i.e. level of drying. It is desirable in preferred embodiments of the invention, to maintain nitrogen product/feed air loss due to co-permeation of said nitrogen or feed air to less than 1%, preferably less than 0.5%, of the total product flow.

It will be appreciated that the membrane composition used in the dryer membrane system should be one having a high selectivity for water over nitrogen. That is, moisture must be selectively permeated much more rapidly than nitrogen. The water/nitrogen separation factor should be at least 50, preferably greater than 1,000, for advantageous moisture removal from product nitrogen gas or feed air. In addition, the membrane composition should have a relatively low permeability rate for both nitrogen and oxygen. Cellulose acetate is an example of a preferred membrane separation material satisfying such criteria. It will be appreciated that a variety of other materials can also be employed, such as ethyl cellulose, silicone rubber, polyurethane, polyamide, polystyrene and the like.

The dryer membrane system having a membrane material of desirable membrane composition, which is integrated with a pressure swing adsorption system as disclosed and claimed herein, is preferably operated in a countercurrent manner as indicated above. In a hollow fiber membrane configuration or in other suitable membrane configurations, e.g. spiral wound membranes, bundle designs providing for flow patterns of the cross-flow type have been commonly employed in commercial practice. In cross-flow operation, the flow direction of permeate gas on the permeate side of the membrane is at right angles to the flow of feed gas on the feed side of the membrane. For example, in the use of hollow fiber bundles and the passage of feed gas on the outside of the hollow fiber membranes, the flow direction of permeate in the bores of the fibers is generally at right angles to the flow of feed over the external surface of the hollow fibers. Likewise, in the inside-out approach in which the feed gas is passed through the bores of the hollow fibers, the permeate gas generally passes from the surface of the hollow fibers in a direction generally at right angles to the direction of the flow of feed within the bores of the hollow fibers and then, within the outer shell, in the direction of the outlet means for the permeate gas. As shown in European Patent Application Publication No. 0 226 431, published June 24, 1987, countercurrent flow patterns can be created by the encasing of the hollow fiber bundle within an impervious barrier over the entirety of its longitudinal outer surface except for a non-encased circumferential region near one end of said bundle. This enables the feed gas or permeate gas, depending on the desired manner of operation, i.e. inside out or outside-in, to pass in countercurrent flow outside the hollow fibers parallel to the flow direction of permeate gas or feed gas in the bores of the hollow fibers. The feed gas on the outside of the hollow fiber bundle, for example, is caused to flow parallel to, rather than at right angle to, the central axis of the fiber bundle. It will be understood that the membrane fibers may be organized either in straight assemblies parallel to the central axis of the bundle, or alternatively, can be wound in helical fashion around the central axis, as in cross-flow operations. In any event, the impermeable barrier material may be a wrap of impervious film, e.g., polyvinylidene or the like. Alternatively, the impermeable barrier may be an impervious coating material, e.g. polysiloxane, applied from an innocuous solvent, or a shrink sleeve installed over the membrane bundle and shrunk onto said bundle. The impermeable barrier thus encases the hollow fiber or other membrane bundle and, as disclosed in said publication, has an opening therein permitting the flow of gas into or from the bundle so that the fluid flows in a direction substantially parallel to the axis of the fiber bundle. For purposes of the invention, the flow pattern should be one of countercurrent flow of the wet, high purity nitrogen or feed air stream and the permeate gas comprising purge gas supplied as indicated above together with moisture and oxygen/nitrogen that permeate through the membrane material in the nitrogen product dryer or the feed air dryer membrane.

It should be noted that membrane drying operations are commonly carried out in the art using a dense fiber membrane. The membrane thickness for a dense fiber is also the wall thickness, and is very large in comparison to the skin portion of an asymmetric membrane or to the separation layer of a composite membrane. For a dense fiber, it is necessary to have a large wall thickness to achieve a significant pressure capability. Thus, dense fibers have a very low permeability rate and require the use of a very large surface area for adequate drying of the nitrogen product. By contrast, asymmetric or composite membranes, preferred over dense membranes for purposes of the invention, have very thin membrane separation layers, with the relatively more porous substrate portion of said membranes providing mechanical strength and support for the very thin portion that determines the separation characteristics of the membrane. Much less surface area is required, therefore, for asymmetric or composite membranes than for dense, homogeneous membranes. Because of the inherently improved permeability obtainable by the use of asymmetric or composite membranes rather than dense membranes, it is desirable to further improve asymmetric and composite membrane performance in preferred embodiments of the invention, to achieve a significant reduction in the loss of valuable product nitrogen by co permeation.

It will be understood that the PSA-nitrogen system employed for purposes of the invention can be a system of any desired number of adsorbent beds that utilizes an adsorbent that is selective either for nitrogen or for oxygen. Adsorbents selective for nitrogen are typically equilibrium selective whereby an equilibrium front of the more readily adsorbable component, i.e. nitrogen, is formed and moves through the adsorbent bed from the feed to the product end thereof. Zeolitic molecular sieve materials, such as 13X and 5A material, are examples of commercially available adsorbent materials of the equilibrium type that are suitable for use in the practice of the invention. As noted above, carbon molecular sieves are materials of a rate or kinetic separation nature, with such materials being selective for oxygen rather than nitrogen. It will be readily understood by those skilled in the art that various PSA processing cycles can be employed, using any desired processing sequence in any number of desired adsorbent beds on a cyclic basis, in the practice of the invention. The cycles disclosed in the above-indicated Werner et al. patent are illustrative of the processing flexibility applicable with respect to pressure swing adsorption systems.

For purposes of the invention, a purge ratio, i.e. reflux purge gas/product gas flow on the non-permeable side, of at least about 10%, but preferably about 20% or above, is desired to keep area requirements, product loss and back diffusion of residual oxygen to a minimum. The purge ratio requirements also tend to be greater at relatively lower product gas pressures than at higher pressures. The amount of any such oxygen back diffusion that can be tolerated will be understood to be dependent on the overall requirements of a particular application. In many instances, it is desirable to limit back diffusion of oxygen to a maximum of 500 ppmv, with such oxygen back diffusion being preferably less that 100 ppmv in the nitrogen product. The amount of reflux purge gas available will, of course, depend on its source and value.

In an illustrative example of the practice of the invention, as in the FIG. 1 embodiment, a nitrogen selective PSA-nitrogen product system can be used to produce 20,000 ncfh of 99.5% nitrogen. Typical air recovery for such a plant would be on the order of 60%, that is, 40% of the feed air flow is available as low pressure waste. In such a system, the air feed pressure is 8 psig, the waste pressure is 5 psig, and the pressure of the wet nitrogen product to the dryer membrane system is 80 psig, at 90° F. For a desired product dewpoint of $-40°$ F., a thermal swing adsorption post-dryer system would consume approximately 6 KW of electrical power and require a regeneration purge of about 2%. This conventional system can be advantageously replaced by a simpler, less costly dryer membrane system comprising hollow fibers in a helical configuration and having a water/nitrogen separation factor, i.e. permeability of water/permeability of product nitrogen, of 6,000, and a water/oxygen separation factor of 1,000. The dryer membrane system is operated using an impervious barrier of polyvinylidene to encase the membrane and create a countercurrent flow pattern in the membrane module. The high purity nitrogen product can be effectively dried in said membrane system with a very low dry product loss of less than 0.5% nitrogen. In less preferred, completely cross flow embodiments, more than 30% of the dry product nitrogen would have to be used to achieve the same level of drying, i.e. the same dewpoint.

It will be appreciated that various changes and modifications can be made in the details of the process and system as herein described without departing from the scope of the invention as set forth in the appended claims. Thus, asymmetric or composite membrane structures can be employed in the dryer membrane system of the invention. While dense membranes are commonly used for product drying applications, such dense membranes are not preferred because of the inherent limitations thereof noted above, although such dense membranes could be used in the practice of the invention.

The permeable membranes employed in the practice of the invention will commonly be employed in assemblies of membrane bundles, typically positioned within enclosures to form membrane modules that comprise the principal element of a membrane system. A membrane system may comprise a single module or a number of such modules, arranged for either parallel or series operation. The membrane modules can be constructed using bundles of membranes in convenient hollow fiber form, or in spiral wound, pleated flat sheet, or other desired membrane configurations. Membrane modules are constructed to have a feed gas (air) side, and an opposite, permeate gas exit side. For hollow fiber membranes, the feed side can be either the bore side for inside-out operation, or the outside of the hollow fibers for outside-in operation. Means are provided for introducing feed gas to the system and for withdrawing both permeate and non-permeate streams.

Since it is known that PSA adsorbents tend to be degraded by contamination with oily vapors and hydrogen sulfide, it is within the scope of the invention to employ an additional adsorbent unit or trap of a suitable material, such as alumina or molecular sieve, to remove such contaminants prior to passage of the feed air to the PSA system.

As indicated above, the purge gas employed in the invention should be a dry or a relatively dry purge gas, as from the sources referred to herein. As used herein, a relatively dry purge gas is one having a moisture partial pressure not exceeding the partial pressure of moisture in the dried nitrogen product gas or dried feed air. Preferably, said purge gas moisture partial pressure will be less than half the moisture partial pressure in the dried gas stream, as will be the case with respect to the sources of purge gas disclosed above.

Membranes will be seen to enable highly desirable systems and processes to be used for drying high purity nitrogen produced in a PSA-nitrogen system or the feed air to said PSA-nitrogen system. By carrying out the drying in convenient membrane dryer systems, the more costly and complicated adsorptive or refrigerative techniques and systems of the art for moisture removal can be avoided. By utilizing the integration of processing streams of the dryer membrane system with the air separation PSA-nitrogen system, a purge of the low pressure, permeate side of the membrane dryer system with relatively dry purge gas is conveniently accomplished. By utilizing a bundle arrangement so as to establish a countercurrent flow pattern, preferred embodiments of the drying operation can be carried out with an enhanced recovery of dry, high purity nitrogen, avoiding the co-permeation of significant amounts of valuable nitrogen product gas or feed air occurs in cross-flow permeation operations.

We claim:

1. An improved process for the production of dry, high purity nitrogen from air comprising:
   (a) passing a wet, high purity nitrogen from a pressure swing adsorption system or wet feed air stream to a dryer membrane system capable of selectively permeating water from said wet stream;
   (b) passing relatively dry purge gas to the low pressure permeate side of said dryer membrane system to facilitate the carrying away of water vapor from the surface of the membrane and maintaining the driving force for removal of water vapor through the membrane from the high purity nitrogen or feed air stream for enhanced moisture removal therefrom, said relatively dry purge gas comprising waste gas from said pressure swing adsorption system or nitrogen product gas, whereby the provision of said purge gas on the permeate side of the dryer membrane system facilitates the desired moisture removal with minimum loss of product gas.

2. The process of claim 1 in which said pressure swing adsorption system contains nitrogen selective adsorbent, wet nitrogen being the more readily adsorbable component of air and oxygen being the less readily adsorbable component thereof.

3. The process of claim 2 in which said dryer membrane system is a post dryer system, and wet, high purity nitrogen from the pressure swing adsorption system is passed thereto to form a dry, high purity nitrogen product gas.

4. The process of claim 3 in which said dry purge gas comprises said less readily adsorbable oxygen separated in said pressure swing adsorption system.

5. The process of claim 3 in which said dry purge gas comprises a portion of the dry, high purity nitrogen product gas formed in said dryer membrane system.

6. The process of claim 1 in which said membrane dryer system contains membrane bundles adapted for countercurrent flow pattern with the permeate gas flowing generally parallel to the flow of feed gas to said system.

7. The process of claim 6 which said dryer membrane system is a post dryer membrane system for the drying of wet, high purity nitrogen from said pressure swing adsorption system containing nitrogen selective adsorbent, with less readily absorbalde oxygen comprising the dry purge gas.

8. The process of claim 6 in which said pressure swing adsorption system contains oxygen selective adsorbent, wet nitrogen being the less readily adsorbable component of air, and oxygen being the more readily adsorbable component thereof.

9. The process of claim 6 in which the dryer membrane system is a pre dryer system adapted for the drying of feed air to form a dry feed air for passage to said pressure swing adsorption system, the more readily adsorbable oxygen separated in the pressure swing adsorption system comprising said dry purge gas.

10. The process of claim 6 in which said dryer membrane system is a post-dryer membrane system for the drying of wet, high purity nitrogen from said pressure swing adsorption system containing nitrogen selective adsorbent, with a portion of the dry, high purity nitrogen product gas comprising said dry purge gas.

11. An improved system for the production of dry, high purity nitrogen from air comprising:
   (a) a pressure swing adsorption system containing adsorbent material capable of selectively adsorbing a more readily adsorbable component of wet feed air, so as to enable wet, high purity nitrogen to be separated from oxygen;
   (b) a dryer membrane system capable of selectively permeating water present in wet, high purity nitrogen from said pressure swing adsorption system or wet fed air streams;
   (c) conduit means for passing relatively dry purge gas to the low pressure permeate side of said dryer membrane system to facilitate the carrying away of water vapor from the surface of the membrane and maintaining the driving force for removal of water vapor through the membrane from the high purity nitrogen stream or feed air stream for enhanced moisture removal therefrom, said selectively dry purge gas comprising waste gas from said pressure swing adsorption system or nitrogen product gas, whereby the provision of said purge gas on the permeate side of the dryer membrane system facilitates the desired moisture removal with minimum loss of nitrogen product gas.

12. The system of claim 11 in which said pressure swing adsorption system contains nitrogen selective adsorbent, wet nitrogen being the more readily adsorbable component of air and oxygen being the less readily adsorbable component thereof.

13. The system of claim 12 in which said dryer membrane system is a post-dryer system adapted for the drying of wet, high purity nitrogen from said pressure swing adsorption system to form a dry, high purity nitrogen product gas.

14. The system of claim 13 in which the less readily adsorbable oxygen separated in the pressure-swing adsorption system comprises said dry purge gas.

15. The system of claim 13 in which said dry purge gas comprises a portion of the dry, high purity nitrogen product gas formed in said dryer membrane system.

16. The system of claim 11 in which said membrane dryer system contains membrane bundles adapted for a countercurrent flow pattern with the permeate gas flowing generally parallel to the flow of feed gas to said system.

17. The system of claim 16 in which said dryer membrane system is a post-dryer system adapted for the drying of wet, high purity nitrogen from said pressure swing adsorption system containing nitrogen selective adsorbent, with less readily adsorbable oxygen comprising the dry purge gas.

18. The system of claim 16 in which said pressure swing adsorption system contains oxygen selective adsorbent, nitrogen being the less readily adsorbable component of air and oxygen being the more readily adsorbable component thereof.

19. The system of claim 18 in which said dryer membrane system is a pre-dryer system adapted for the drying of feed air to form a dry feed air for passage to said pressure swing adsorption system.

20. The system of claim 19 in which the more readily adsorbable oxygen separated in the pressure swing adsorption system comprises said dry purge gas.

21. The system of claim 16 in which said pressure swing adsorption system contains nitrogen selective adsorbent, said dryer membrane system is a post-dryer system adapted for the drying of wet, high purity nitrogen, and a portion of the dry, high purity nitrogen product gas comprises said dry purge gas.

* * * * *